Sept. 20, 1960   W. D. CARRIE   2,953,015
PRESSURE TEST GASKET
Filed Dec. 30, 1957
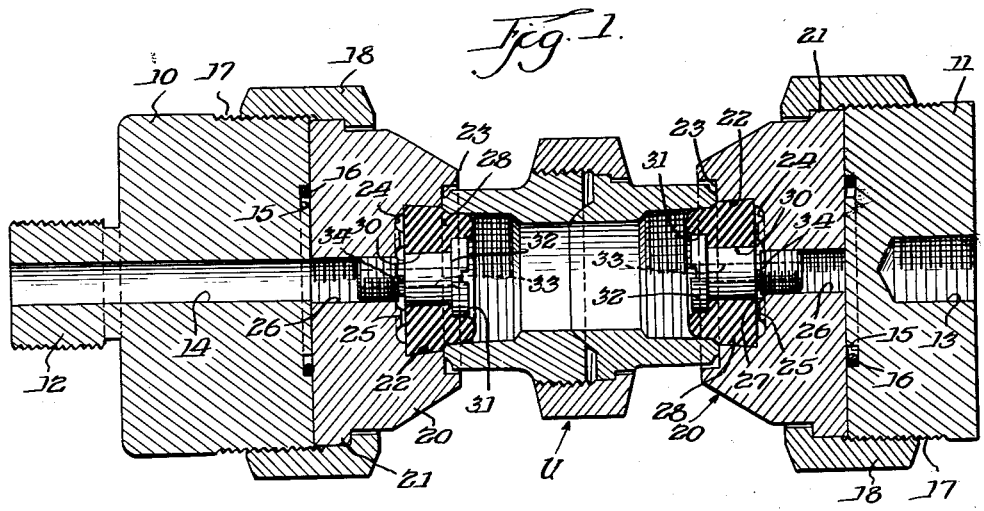
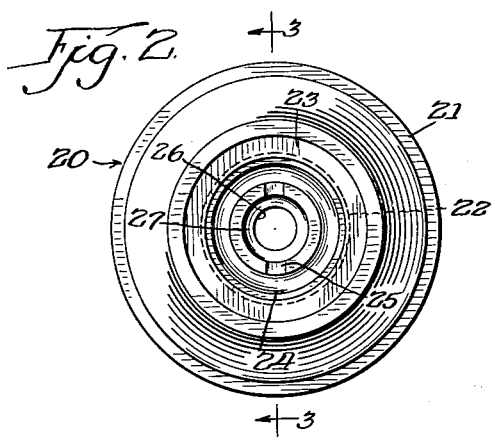
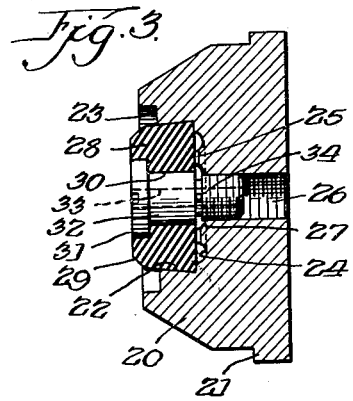
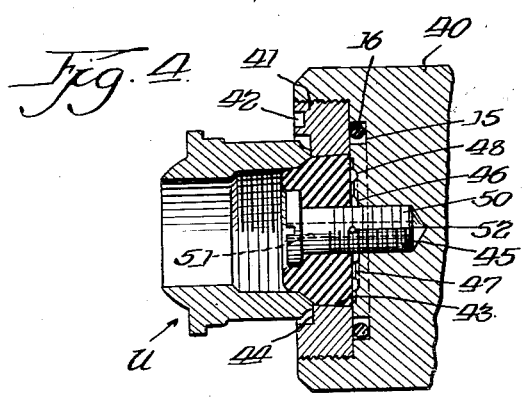
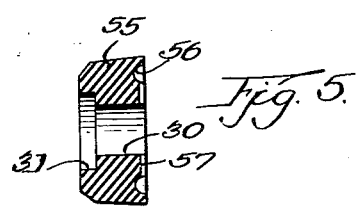
Inventor:
William D. Carrie.
By Joseph O. Lange
Atty.

United States Patent Office 2,953,015
Patented Sept. 20, 1960

2,953,015
PRESSURE TEST GASKET

William D. Carrie, Lisle, Ill., assignor to Crane Co., Chicago, Ill., a corporation of Illinois Filed Dec. 30, 1957, Ser. No. 706,019
6 Claims. (Cl. 73—49.8)

The present invention relates generally to a pressure test gasket construction, and more particularly to a sealing construction for closing an open end of a hollow article in testing by internal fluid pressure.

In testing hollow articles such as pipe fittings for leaks, bursting strength, and the like by applying fluid pressure internally thereto, any open ends of the article must of course be sealed by a gasket or the like. With gasketing constructions heretofore employed, the effect of the pressure in compressing the gasket tended to allow leakage and blow-out, requiring even greater clamping pressure of the article end against the gasket to retain the pressure. This resulted in excessive wear on and early failure of the gasket due to cutting action of the article thereon, with consequent frequent shutdowns of the testing equipment for gasket replacement. By the present invention, the gasket is not subjected to pressure or cutting action by the article, and in addition has applied thereto only relatively low sealing pressure. It therefore has a long useful life, yet seals against the article end with sufficiently great pressure for positive retention of the test pressure fluid in the article. The invention further permits quick conversion of the test equipment to operation on articles of different opening sizes, giving great operational flexibility to the equipment and reducing investment in apparatus.

It is an object of the present invention to provide a sealing construction for testing of open-ended hollow articles by internal fluid pressure which lengthens gasket life by eliminating clamping pressure of the article thereon.

Another object is the provision of a sealing construction for closing an open end of a hollow article under internal pressure test by which the gasket is held sealing relation with the article by fluid pressure.

Another object is the provision of a sealing construction for closing an open end of a hollow article under test by internal fluid pressure which effects sealing relation of a gasket with the article end by differential pressure action of the test fluid on the gasket.

Other and further objects, advantages, and features of the invention will be apparent from the following description, taken in conjunction with the accompanying drawings, in which:

Fig. 1 is a longitudinal sectional view through a pipe union under internal pressure test in one embodiment of apparatus according to this invention;

Fig. 2 is an end elevation of a portion of the sealing construction of Fig. 1, the gasket being omitted;

Fig. 3 is a sectional view taken substantially on the line 3—3 of Fig. 2, with a gasket in place therein;

Fig. 4 is a fragmentary sectional view of another embodiment of the invention; and Fig. 5 is a sectional view of a modified form of gasket according to the invention.

Referring first to Fig. 1 of the drawings, there is shown a pair of opposed chucks 10 and 11 adapted to be mounted for relative movement toward and from each other on suitable supports, not shown. The chuck 10 is shown as provided with a threaded projection or stud 12 extending from its outer end for the purpose of mounting of the chuck, while the chuck 11 has a threaded bore 13 in its outer end for the same purpose. A passage 14 extends axially through the chuck 10. In the inner face of each chuck is formed an annular groove 15 receiving an O-ring 16 therein. Each chuck is circumferentially threaded adjacent its inner face as indicated at 17 for cooperation with a securing ring 18 by which a seat member 20 is detachably held tightly against the chuck. The rings 18 are shown as pipe union rings of appropriate size, so that they may easily and cheaply be replaced if damaged or lost, although of course similar rings may be specially made for the same purpose if desired. Each seat member 20 has a flange 21 adjacent its face engaging the inner face of the chuck for engagement by the ring 18 to clamp the seat member on the chuck, the O-ring 16 providing a seal therebetween.

In the other or inner face of each seat member is formed an undercut recess 22, in this case of conical form tapering toward the mouth thereof, and an offset or counterbore defining a shoulder providing a thrust or seat surface 23 about the mouth of the recess. The bottom of the recess is provided with one or more annular grooves 24 communicating through a shallower diametrical slot or groove 25 with a counterbore or depression 27 about a threaded bore 26 extending axially through the seat member 20. The bore 26 of the member 20 on chuck 10 communicates with the chuck passage 14. An annular gasket 28 of rubber, plastic, or other suitable material is disposed in the recess 22, the normal or undistorted shape of the gasket being clearly shown in Fig. 3. The gasket has a flat bottom face engaging on the bottom of the recess and overlying the groove means 24 and 25, and has an axial dimension greater than the depth of the recess so as to project outwardly thereof beyond the seat surface 23. The portion of the gasket within the recess conforms substantially to the recess shape, in this instance tapering from its bottom face. A chamber 29 may be provided about the other face of the gasket, to facilitate engagement of the open article end on the surface 23. It will be evident that the bottom face of the gasket is of greater area than the area within any line of contact of the gasket with an open end of a test article. The gasket has a central aperture 30 therethrough of greater diameter than the bore 27 with a counterbore 31 at the smaller end or face of the gasket, through which a headed retaining member such as the screw 32 extends. The screw has a reduced threaded end portion engaging in the seat member bore 26 to hold the gasket in place. The larger diameter screw portion adjacent the head engages against the recess bottom to prevent distorting of the gasket thereby. The head of the screw 32 lies substantially flush with the smaller face of the gasket, being received in the counterbore 31. A fluid passage 33 is formed longitudinally through the screw, and is intersected by a transverse bore 34 just below the shoulder defined between the larger and smaller portions of the screw.

A pipe union U, comprising the usual threadpiece, tail piece and ring, is shown in Fig. 1 as the hollow article under internal fluid pressure test, although of course the invention may be used with other hollow open-ended articles. The union is positioned with its opposite open ends engaged on the thrust or seat surfaces 23 of the respective seat members 20 of the chucks 10 and 11 and clamped therebetween. The gaskets 28 engage the inner surfaces of the ends of the union. Suitable fluid under the desired pressure, in this case air, is introduced into the interior of the article through the passage 14 of the chuck 10, the bore 26 of the seat member 20, and the fluid passage 33 of the associated screw 32. The test fluid also passes through the bore or passage 34 of the screw 32 adjacent passage 14 to the depression 27 and grooves 24 and 25 so as to exert its pressure on the bottom face of the gasket 28, the gasket with the groove means defining passages for the fluid. The fluid similarly flows through the passages 33 and 34 of the screw 32 at the other end of the union into the groove means. The passage 34 might be dispensed with and the fluid allowed to pass between the threads of the screw and its receiving bore 27 into the passages formed by the gasket 28 and the recess bottom grooves, but the threads might become blocked by accumulation of foreign matter. Of course, the test fluid could be introduced otherwise than by means of passage 14. Escape of fluid between the seat members 20 and their respective chucks is prevented by the O-rings 16. Both faces of each gasket 28 are thus subjected to fluid at the same pressure, that is, the test pressure to which the union is subjected. Since the area of the gasket bottom face is greater than the area subjected to the pressure within the union, there is a pressure differential acting on each gasket urging it into tight sealing engagement with the end of the article. The difference in total pressure need be only a few pounds to assure positive sealing, so that the gaskets are not subjected to undue stress. In addition, the gaskets are not clamped or otherwise pressed by the ends of the union, since the union is engaged directly between the surface 23 and the clamping stresses are borne only by the holding means comprising the chucks and seat members. Since the gaskets are subjected to only light pressure stresses and are not likely to be cut by the article ends, they wear relatively slowly and have a relatively long useful life, several times that of gaskets previously employed for the same purpose. The construction also allows ready replacement of worn gaskets when necessary.

Another embodiment of the inventive concept is illustrated in Fig. 4, in which a chuck 40 is shown having in its inner face a recess threadedly receiving an annular seat member 41 which overlies a groove 15 with an O-ring 16 disposed therein to seal between the chuck and seat member. Spanner wrench holes 42 may be provided in the member 41 to enable its ready application and removal. The aperture 43 of the annular seat member is formed undercut or tapering from the face bottoming in the chuck recess to a mouth about which is a counterbore or shoulder providing a thrust or seat surface 44 similar to the surface 23 of the embodiment of Fig. 1. In the bottom of the chuck recess is formed a tapped hole 45, about the mouth of which is a depression 46 connected by a diametrical groove 47 with an annular groove 48. The tapered portion 43 of the seat member 41 forms with the bottom of the chuck recess an undercut gasket recess substantially similar to the recess 22 previously described. In this recess, the gasket 28 is disposed, held in place by a screw 50 threaded in the hole 45. The screw 50 is similar to the screw 32, having extending therethrough a longitudinal passage 51 and a transverse passage 52 intersecting the passage 51. The passage 52 is located to communicate with the depression 46 in the chuck 40 when the screw bottoms in the hole 45, such bottoming occurring before any distortion of the gasket by the screw can take place.

The operation of this embodiment is substantially the same as that of the embodiment of Figs. 1 to 3. In Fig. 4, there is shown only one chuck and only the tailpiece of the union U, but it will be understood that a similar chuck and gasket arrangement may be provided for the other end of a complete union.

In both of the foregoing embodiments, the seat members and gaskets may be readily replaced by others of corresponding structure but dimensioned radially and/or axially to cooperate with hollow articles of different lengths and sizes of open ends. The construction of Fig. 1 is preferred because it allows quicker and easier changing of the seat members, and is safer in that an operator's hands need not come between the chucks. The structure of Fig. 4 is advantageous in that gaskets too hard to be forced into the gasket recess through the mouth thereof may readily be employed when desired by insertion through the larger end of the aperture of the annular seat member.

A gasket 55 is shown in Fig. 5 which is similar to the gasket 28 previously described, having its bottom face larger than its article-engaging portion, and with the opening 30 and counterbore 31 formed therein. In the bottom face there are molded or otherwise formed one or more annular grooves 56 and a diametrical connecting groove 57. This gasket eliminates the need for forming grooves in the gasket-receiving recess of the holding means of Figs. 1 to 3 or Fig. 4, since the grooves 56 and 57 form the desired fluid passages when the gasket is disposed in the recess.

It will be understood that the provision of groove means in either the gasket or the bottom of the gasket recess of the holding means to form passages for the pressure fluid assures positive and quick application of the fluid pressure to the larger gasket face, although the fluid would force its way between the gasket and the recess bottom even without such passages. Of course, the passages might be provided otherwise than as specifically disclosed. It should also be evident that the shape of the gasket and the recess therefor may be different from that shown, so long as it provides for the differential pressure on the inner and outer faces of the gasket.

The constructions disclosed herein may be varied in numerous ways, being set forth by way of example, and the invention is not intended to be limited otherwise than as required by the spirit and scope of the appended claims.

I claim:

1. Apparatus for testing hollow open-ended articles by application of fluid pressure internally thereof, comprising gasket holder means for each open end of an article to be tested defining an undercut recess with a thrust surface about the mouth thereof shaped and dimensioned to receive the article end thereon, a gasket substantially conforming to the shape of and disposed in the recess and projecting outwardly of said surface with a tapered portion thereon for sealing engagement with the interior of the article end and having its face adjacent the bottom of the recess of greater area than the area exposed to the interior of the article, fluid passage means defined by relief means between said gasket and the bottom of the recess, means providing fluid communication through the gasket between the article interior and said passage relief means, means for maintaining the article with each open end thereof engaged with adjacent holder means, and means for supplying fluid under pressure to the interior of the article.

2. Apparatus for testing hollow open-ended articles by fluid pressure applied internally to the articles, comprising gasket holder means for each open end of an article to be tested defining an undercut recess with a thrust surface about the recess mouth to engage the article end, a gasket substantially conforming to the shape of and disposed in the recess with a tapered portion beyond the recess for sealing contact of its outer end with the article end, the area of the face of the gasket within the recess exceeding the area of the gasket exposed to the interior of the article, passage means defined by projections in spaced relation between the bottom of the recess and the gasket, means positioning the gasket and providing fluid communication through the gasket from the interior of the article to said passage means, means for holding the article with each open end engaged on the adjacent holder means thrust surface, and means for supplying fluid under pressure to the interior of the article.

3. Apparatus for testing hollow open-ended articles by application of fluid pressure internally thereto, comprising gasket holder means for each open end of an article to be tested defining an undercut recess with a thrust surface about the mouth thereof shaped and dimensioned to receive the article end snugly thereon, a gasket substantially conforming to and disposed in the recess with an outer tapered end for sealing engagement of its said outer tapered end with the article end and having its face adjacent the bottom of the recess of greater area than the area exposed to the interior of the article, ported retaining means within the gasket recess providing fluid passage through the gasket from the interior of the article to said gasket face, means for holding the article with each open end engaged with the corresponding thrust surface, and means for supplying fluid under pressure to the interior of the article.

4. Apparatus for testing hollow open-ended articles by application of fluid pressure internally thereto, comprising a holder for each open end of an article to be tested, an annular seat member secured in facing relation on said holder having the aperture therethrough of greater area at the face adjacent the holder than at the outer face and also having a surface annularly extending about the outer end of the aperture for receiving the article end thereon, a gasket having a tapered outer portion thereon substantially conforming to the shape of and disposed in the seat member aperture for sealing engagement of its outer end with the article end, fluid passage means providing communication through the gasket between the interior of the article and the inner end of the gasket, means for holding the article with each open end engaged on a receiving surface of a seat member, and means for supplying fluid under pressure to the interior of the article, the said fluid supply means including hollow screw means engaging the said gasket and with port means communicating with the face adjacent the said greater area of the annular seat member.

5. Apparatus for testing hollow open-ended articles by application of fluid pressure internally thereto, comprising a seat member for each open end of an article to be tested having opening outwardly therefrom a recess with a mouth of smaller area than its bottom and also having a surface about said recess mouth for reception of the article end thereagainst, a gasket substantially conforming to the shape of and disposed in the recess and with an annularly tapered portion for sealing engagement of its outer end with the article end, and fluid passage means providing communication through the gasket between the interior of the article and the inner end of the gasket, means for holding the article with each open end engaged on a reception surface, and means for supplying fluid under pressure to the interior of the article, said fluid passage means including gasket retaining hollow means mounted in the seat member recess and having port means extending axially and transversely thereof to supply fluid pressure to the said inner end of the gasket.

6. Apparatus for testing hollow open-ended articles by internal application thereto of fluid pressure, comprising holder means for each open end of an article to be tested defining an undercut recess with a thrust surface about the mouth of the recess dimensioned to receive the article end thereon, a gasket predeterminately movable axially substantially conforming to the shape of the recess and disposed therein and with an annular tapered portion for sealing engagement of its outer end with the article end, groove means cooperating with the inner end of the gasket defining fluid passage means with the bottom of the recess, means providing fluid communication between the interior of the article and said passage means, means for holding the article with each open end engaging against a thrust surface, and tubular means engaging said holder means for retaining the gasket within the recess to limit said predetermined axial movement of the said gasket and having through port means for supplying fluid under pressure to the interior of the article.

References Cited in the file of this patent

UNITED STATES PATENTS

| | | |
|---|---|---|
| 2,062,527 | Postlewaite | Dec. 1, 1936 |
| 2,655,182 | Hayes et al. | Oct. 13, 1953 |
| 2,780,092 | Govan | Feb. 5, 1957 |

UNITED STATES PATENT OFFICE
CERTIFICATE OF CORRECTION

Patent No. 2,953,015  September 20, 1960

William D. Carrie

It is hereby certified that error appears in the printed specification of the above numbered patent requiring correction and that the said Letters Patent should read as corrected below.

Column 2, line 39, for "chamber" read -- chamfer --.

Signed and sealed this 11th day of April 1961.

(SEAL)
Attest:

ERNEST W. SWIDER
Attesting Officer

ARTHUR W. CROCKER
Acting Commissioner of Patents